(12) United States Patent
Soules

(10) Patent No.: US 6,423,900 B1
(45) Date of Patent: *Jul. 23, 2002

(54) ACTIVE COVER PLATE FOR AN ELECTRICAL OUTLET

(75) Inventor: Jack Arbuthnott Soules, Shaker Heights, OH (US)

(73) Assignee: Technical Systems Corp., Cleveland, OH (US)

(*) Notice: Subject to any disclaimer, the term of this patent is extended or adjusted under 35 U.S.C. 154(b) by 56 days.

This patent is subject to a terminal disclaimer.

(21) Appl. No.: 09/590,951

(22) Filed: Jun. 9, 2000

Related U.S. Application Data

(63) Continuation-in-part of application No. 09/024,418, filed on Feb. 17, 1998, now Pat. No. 6,087,588.

(51) Int. Cl.[7] ................................................. H02G 3/14
(52) U.S. Cl. ............................ 174/66; 220/3.8; 220/241
(58) Field of Search ........................... 174/66, 67, 50, 174/53, 55, 59, 135, 48, 49; 220/241, 3.8, 242

(56) References Cited

U.S. PATENT DOCUMENTS

| | | | | |
|---|---|---|---|---|
| 2,015,698 A | * | 10/1935 | Tiffanny .................. | 174/66 |
| D141,030 S | * | 4/1945 | Wheeler, Jr. ............. | D26/13 |
| 2,428,167 A | * | 9/1947 | Linton ..................... | 220/241 |
| 2,575,820 A | * | 11/1951 | Linton ..................... | 220/241 |
| 2,934,590 A | * | 4/1960 | Thompson et al. ........ | 174/66 |
| 3,522,595 A | * | 8/1970 | White ...................... | 174/66 |
| 3,680,237 A | * | 8/1972 | Finnerty .................. | 40/130 M |
| 3,859,454 A | * | 1/1975 | Mann ...................... | 174/66 |
| 4,282,591 A | * | 8/1981 | Andreuccetti ............ | 174/66 |
| 4,534,486 A | * | 8/1985 | Edison .................... | 220/241 |
| 5,485,356 A | | 1/1996 | Nguyen .................... | 362/95 |
| 6,087,588 A | * | 7/2000 | Soules ..................... | 174/66 |

* cited by examiner

*Primary Examiner*—Dean A. Reichard
*Assistant Examiner*—Angel R. Estrada
(74) *Attorney, Agent, or Firm*—Alfred D. Lobo

(57) ABSTRACT

An active cover plate is provided for a standard electrical device such as a switch or receptacle which has a body unit-molded from a synthetic resin. The active cover plate is so termed because an active load is embedded within it. The exterior of the body is provided with at least a pair of terminals for connection to a building's current supply. A pair of opposed spring-strips embedded in the plate are positioned so as to protrude rearward from the plate and contact terminals on the device. The spring-strips are connected to terminals of the active load. Contact of the spring-strips against the terminals is good enough to provide the active load with the current it needs. The active load may be an electroluminescent panel, one or more light emitting diodes, an array of organic light emitting diodes, or a radio transmitter, or receiver preferably coupled with an annunciator or other signalling means, or any other device which consumes less than about 25 watts, and the components of which can be sandwiched within the plate.

16 Claims, 12 Drawing Sheets

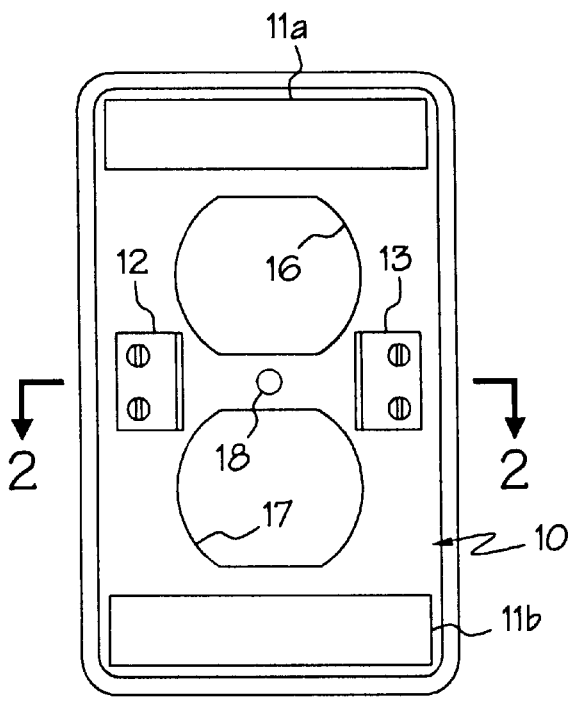
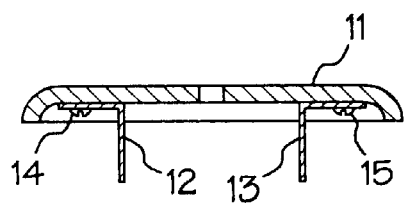
FIG. 1
FIG. 2
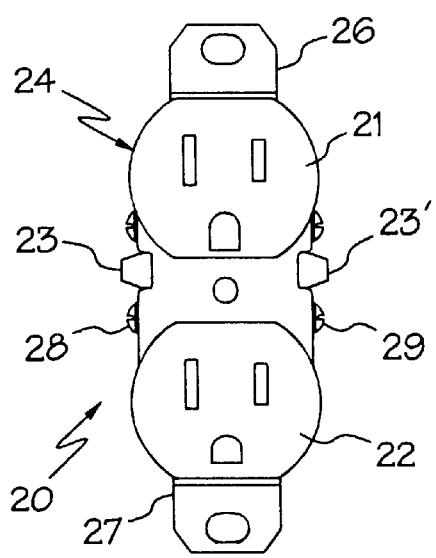
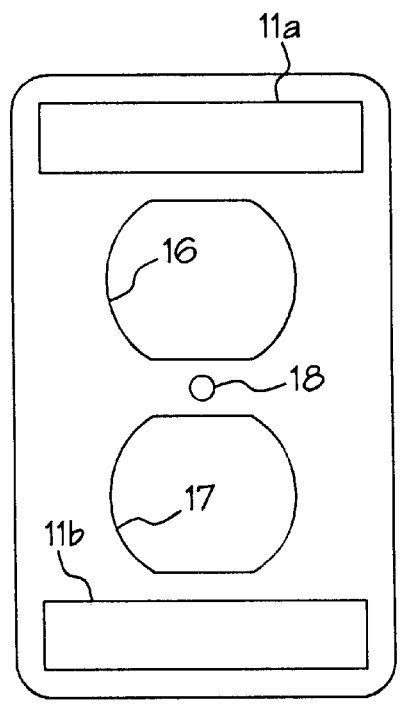
FIG. 3
FIG. 4

ACTIVE COVER PLATE FOR AN ELECTRICAL OUTLET

CROSS-REFERENCE TO RELATED APPLICATION

This application is a continuation-in-part application of Ser. No. 09/024,418 filed Feb. 17, 1998 now U.S. Pat. No. 6,087,588.

FIELD OF THE INVENTION

This invention relates generally to a cover plate of dielectric material which is converted to an "active" cover plate by connecting it to a source of electric current through "live" terminals of a commercially available standard electrical device such as a common switch or wall receptacle, or combination thereof The term "standard" refers to devices deemed standard by the National Electrical Code published by National Fire Protection Association, and as revised from time to time, and referred to in Guide to the 1975 National Electrical Code by Roland E. Palmquist, Publisher Howard W Sams, Indianapolis, Ind. (1975).

An "active" cover plate is defined as one to which electrical power is directly supplied for use therein, that is, the plate consumes power. The active cover plate is fitted to an installed device without modifying or interfering with the existing wiring, and without being plugged into the device's body. Each cover plate has embedded or sandwiched in it a "load" and associated circuit components. More particularly, the invention relates to a cover plate in which the embedded load is an electroluminescent panel; by its electroluminescence the plate indicates that the device (whether switch or receptacle) is connected to a source of current, that is, energized. In another embodiment the invention relates to an active cover plate which is not electroluminescent, but supplies enough current to the "load" which is integral with and "slaved" to the cover plate which itself functions, for example, as a radio transmitter or receiver; and, in yet another embodiment, an active cover plate is both electroluminescent and a transmitter or receiver, that is, the plate simultaneously provides enough power for the load which includes plural functional components.

BACKGROUND OF THE INVENTION

Lighting devices which produce diffused light at relatively low intensity to provide sufficient visible light useful for human eyes to discern objects in the dark, are extensively used where low-level lighting is desirable. In particular, an electroluminescent cover plate is routinely used as a nightlight over a conventional electrical receptacle, typically a duplex wall receptacle (using one of the two available plug-in portions or sockets) or over a receptacle which may include a light switch in a bathroom or bedroom (using the only available socket). A commercially available night-light, such as one sold under the trademark Limelite® by Austin Innovations as Model No. 11100, may be plugged into the socket of a conventional wall receptacle. The popularity of the electroluminescent cover plate derives from its inherently "fail-safe" construction, and its ability to operate continuously for an arbitrarily long time, producing a subdued lighting.

In U.S. Pat. No. 3,588,489 to Gaines there is illustrated an electroluminescent panel between dual receptacles in a unique body case which houses three sets of opposed contact slots separated by a pair of vertically grooved transverse ribs. The panel is centered between openings for prongs to be plugged into the corresponding receptacle beneath the cover which is an application-specific cover plate for a wall-mounted duplex receptacle. The cover has a pair of opposed prongs which are inserted in opposed contact slots to provide current to the panel.

A few years later U.S. Pat. No. 3,307,030 to DeFrancisco disclosed an electroluminescent cover plate which provided plug apertures or a slot for a switch handle, but required that the plate have a pair of prongs which were to be plugged into a plug-in receptacle which required an extra central plug-in portion into which the prongs could be plugged into.

Very recently, in U.S. Pat. No. 5,485,356, Nguyen teaches a cover plate for a duplex receptacle, and to the rear surface of the plate is secured a resilient and flexible U-shaped conductive strip the arms of which provide contact plates which are inserted into contact members on each side of the body of the receptacle. The purpose of the device is to energize an indicator light when the receptacle is energized. The cover plate itself is not active and relies on the indicator light to indicate whether the receptacle is energized.

The cover plate may be active even on a switch, typically a wall-mounted light switch, which serves only to close or open the circuit for residential current, typically 110 V or 220 V, and which switch is grounded (for safety) through its frame to the metal box in which the switch is mounted.

SUMMARY OF THE INVENTION

It has been discovered that a pair of electrically conductive biasing means such as contacting spring-strips secured within a synthetic resinous ("plastic") cover plate and in electrical contact with a load secured therein, provides adequate electrical contact to permit the use of the cover plate as an "active" plate which simply and inexpensively accomplishes any one or more of several desirable functions. The circuit is secured to the cover plate in a manner so as to preclude human contact with a component of said circuit capable of inflicting an easily sensible and undesirable shock. Most preferably the circuit is embedded or sandwiched within the cover plate, transforming the cover plate into an "active device".

Accordingly an active cover plate is provided for a standard electrical device having a unit-molded body on the exterior of which at least a pair of terminals is adapted for connection to a source of electrical current, without modifying the device's body, and without interfering with the wiring of the device (whether switch or receptacle, or combination thereof) after it is installed. The circuit includes a "load" supplied with enough power through contact with a pair of biasing contact means, each adapted to contact one of the terminals disposed exteriorly of the body of the electrical device. The contact resistance between the biasing means and the terminals is not important because the power requirement of the load is small.

In a specific embodiment, the load in an active cover plate is an electroluminescent material and the synthetic resinous material is preferably translucent or sufficiently transparent to visible light to allow illumination from the panel to be seen. When the cover plate is installed on a common and commercially available electrical device (switch or wall receptacle) the plate is illuminated continuously, while also indicating that the device is energized. Installation of the active cover plate does not require plugging the cover plate into the body of the device. The spring-strips, or equivalent contact means, contact the heads of screws on terminals supplying current on one or the other side of the body of the receptacle, or both sides; the screws are used to provide connection to available current supply leads. A wall receptacle has at least one plug-in socket opening forwardly thereof for receiving connecting prongs of a plug, to connect an electrical appliance or other device with a source of potential.

It has further been discovered that contacts such as spring-strips on the rear surface of an insulating cover plate for a standard device, provide good enough contact to transmit enough current to the electrodes of a luminescent panel, not only to generate luminescence in the cover plate but also to power any low voltage, low power (less than about 25 watts) electronic device small enough to be accommodated within the confines of a cover plate which is preferably not more than 10 mm thick; but the contacts do not provide enough power to present a danger to a human who comes in contact with the active cover plate. If desired the entire cover plate may be formed from an electroluminescent material, and electrodes for the material are connected to the opposed spring-strips.

Where the luminescence is not required, the active cover plate may be made from a conventional non-electroluminescent synthetic resinous insulating material. Such a cover plate itself functions as a radio transmitter activated by a microphone; or, as a radio receiver which picks up a signal either from the ambient surroundings or from AC lines conducting current for the household or building supply. The receiver actuates a miniature loudspeaker integral with the cover plate.

When a load requires more current than is typically required to activate an electroluminescent panel, that is more than about 0.1 watt, and the cover plate is to be used on a switch in a circuit for a residential application (light bulb, appliance, etc), to which switch only a power wire (black) and a ground wire (green) are connected, a circuit is provided which limits power to about 5 milliamps at the ground wire, the circuit comprising ratioed resistances and a rectifier, a load-limiting resistor and a battery means configured to deliver from 1 to 20 milliamps at a voltage in the range from about 5 to 15 volts.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 1 is a rear view of an active cover plate for twin plug-in sockets in a standard duplex receptacle, the cover plate having an electroluminescent panel embedded therein.

FIG. 2 is an enlarged cross-sectional view taken along the line 2—2 in FIG. 1.

FIG. 3 is a front view of a conventional plug-in duplex receptacle to which the active cover plate is attached without being plugged into the duplex receptacle's body.

FIG. 4 is a front view of the active cover plate shown in FIG. 3.

DETAILED DESCRIPTION OF PREFERRED EMBODIMENTS

Figure 5:
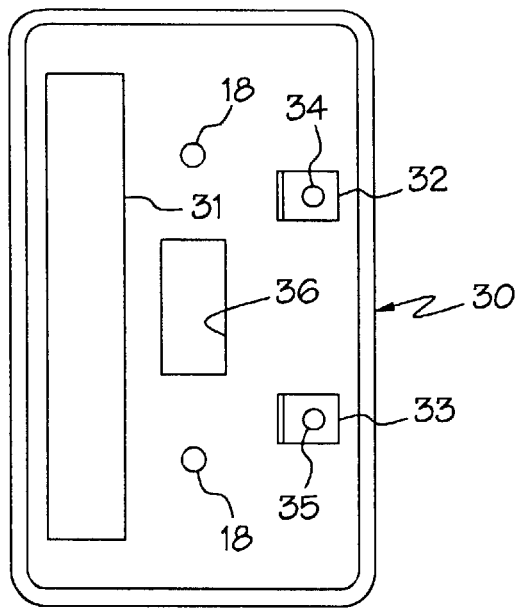
FIG. 5 is a rear view of an active cover plate for a switch, the cover plate having embedded therein an electroluminescent panel which consumes less than about 0.1 watt, but at high voltage available from the 110 V power lead (black wire), the return lead from the load being connected to ground through a ground (green) wire.

Buildings have wall switches and wall receptacles into which a wide variety of appliances or floor lamps and the like, may be plugged, to receive electrical current. The wall switches typically supply current to ceiling lights, outdoor lights, ceiling fans, etc. Such commercially available switches (e.g. single pole Leviton 1451-I) and wall receptacles (e.g. Leviton 5320-I for three-pronged, and 223-I for two-pronged plugs), and combinations thereof (e.g. Leviton 5225-I) are permanently connected to the incoming electrical supply, usually 120 V or 220 V AC. The cover plates of this invention are adapted to be fitted over such electrical devices, replacing conventional cover plates and automatically placing the cover plate in electrical communication with a pair of terminals for the live wires without in any way modifying the conventional electrical device whether it is a switch or a receptacle. It is desirable to find a switch or receptacle in the dark, particularly in a strange room It is also desirable to avoid giving up the use of one receptacle in a duplex receptacle for purposes other than to plug in an electroluminescent panel, solely because one needs light to see the other receptacle.

Referring to FIGS. 1 and 2, numeral 10 refers to a translucent synthetic resinous ("plastic") cover plate in which is visible one or more electroluminescent plates 11a, 11b molded within it. If only one, it may occupy only the top, as indicated by 11a, or the bottom portion of the cover plate, as indicated by 11b; and for more light, both the top and the bottom. A pair of opposed right-angled electrically conducting spring-strips 12, 13 are secured, one on each side of the vertical central axis of the cover plate 10 with securing means such as rivets or screws 14, 15 which place electrodes of the panels in contact with a source of electric current, typically 120 volts or 220 volts AC. Preferably the ends of the rivets 14, 15 are embedded in the cover plate (as shown) and do not protrude from the face thereof Most preferably the electroluminescent plates 11a, 11b are laminated between a pair of congruent translucent plates of synthetic resin such as Lexan® polycarbonate. The plate is self-limiting in the amount of current it draws depending upon the plate's area and the frequency of the AC supply. For ordinary buildings such as residences, office complexes, warehouses, workplaces in assembly plants, and the like, where current is supplied at from about 120 volts to 240 volts AC, the current drawn by the plate is limited in the range from about 1 to about 100 milliamps. The active cover plate is an effective insulator against transmitting a shock to human beings; if the ends of the screws 14, 15 are allowed to protrude, then those ends are insulated from the plate 10 with appropriate insulating means such as insulating washers (not shown).

In the particular embodiment illustrated, cover plate 10 has a pair of vertically spaced apart apertures 16, 17 correspondingly sized and shaped to receive the sockets 21, 22 which are off-set from its body 24 (by the thickness of the cover plate 11) of a duplex receptacle 20 illustrated in FIG. 3. Other standard cover plates may have only one or several openings through which a plug for the cord of an electrical appliance may be inserted, to connect it to the source of power. The body 24 is a one-piece molding of insulating material configured as a standard duplex receptacle and provided with a threaded bore 25 to receive a screw (not shown) slid through aperture 18 in the cover plate to secure it to the body; and, the body is provided with mounting ears 26, 27 for mounting the body in a wall box (not shown). The sockets 21, 22 are shown without an opening for a neutral prong which opening may also be provided in another standard duplex receptacle. Accordingly, only twin screws 28 for connecting the power lead, and twin screws 29 for connecting the neutral lead of a conventional 120 volt AC current supply are shown. Each set of twin screws is conventionally connected with an electrically conducting connecting strip having laterally projecting tabs 23, 23' respectively which are part of the current supply fastening means, to connect the sockets of the receptacle with the source of electrical current.

Referring further to FIG. 2, the section through the spring-strips 12 and 13 shows the strips are wide enough to contact both screws 14 and 15 respectively on either side, ensuring that each spring-strip contacts at least one screw on each side. The spring-strips are preferably made from a copper alloy having a high spring constant and each is positioned so as to contact the fastening means whether it is the upper surface of at least one of the twin screws 28, 29 on each side, or a tab 23, 23' of the connecting strip connecting each set of twin screws. The panels 11a, 11b are illuminated as soon as the spring-strips make contact with the terminals.

An electroluminescent panel 11a, 11b typically comprises a multilayer assembly having planar electrodes across a dielectric, e.g. a phosphor-containing synthetic resinous or ceramic material in which excitable phosphors are distributed so that application of an AC voltage to the electrodes produces a luminous glow. The construction of such electroluminescent panels is well known and forms no part of this invention. However, such conventional panels are provided with a pair of plug-in prongs (typically, folded-over conductive strips) which are received in a receptacle of the duplex receptacle. Thus, in a conventional electroluminescent cover plate for a duplex receptacle, one receptacle is used by the cover plate, leaving only one receptacle for its intended use.

Figure 6:
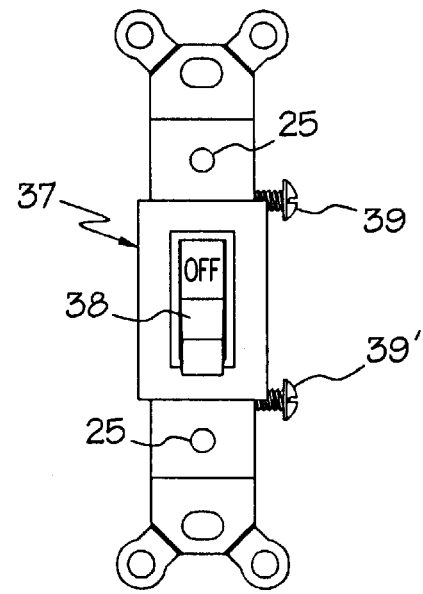
FIG. 6 is a front view of the standard switch.
Figure 7:
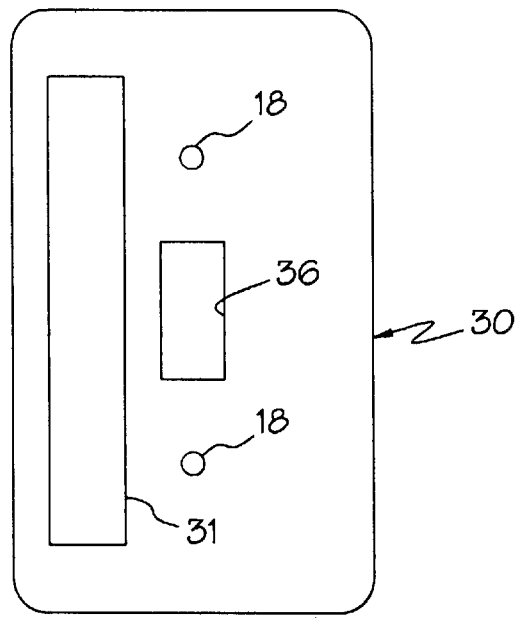
FIG. 7 is a front view of the active cover plate shown in FIG. 5.

An electroluminescent cover plate for a standard switch is not available because there is no easy and convenient way to connect such a plate to terminals on the body of such a switch. Referring to FIGS. 5, 6 and 7, there is shown an active cover plate 30 which comprises an electroluminescent panel 31 embedded in the side thereof, and a pair of opposed right-angled electrically conducting spring-strips 32, 33 secured on either side of the central horizontal axis of the cover plate 30, with securing means such as rivets or screws 34, 35, as before. To avoid embedding the panel, it may be secured to surface of the cover plate, preferably the front surface, and covered with a light-transmitting material which insulates a human against shock. However such mounting of the active load on the surface of the cover plate makes the load susceptible to damage when the load suffers an inadvertent impact from persons or articles passing too close to the electrical device. The cover plate is mounted to the switch with mounting screws through apertures 18. The spring-strips 34, 35 are positioned so as to bias them against terminals 39, 39' of a standard switch assembly 37. A central vertical slot 36 allows the handle 38 of the switch to be inserted through the slot. Electrodes from the panel 31 are connected to the rivets with copper wires and all are conveniently laminated, as in FIGS. 1, 2 & 4, between translucent plastic plates.

Referring to FIGS. 5 & 6, a cover plate installed over the switch (not shown) which protrudes through opening 36, obscures a power (black) wire which is interrupted by the switch; when the switch is in the OFF position, current flows from screw 39 through the electroluminescent panel 31 and the through screw 39' and the load (example, a light bulb) to which 39' leads, because there is essentially no resistance in the load. The panel will light only when there is no light bulb or other load connected in the switched circuit, because when the switch is in the ON position terminals 39 and 39' are connected and no current flows to the panel. In a circuit which turns the lights on in a room electroluminescence of the panel serves no useful purpose.

Figure 10:
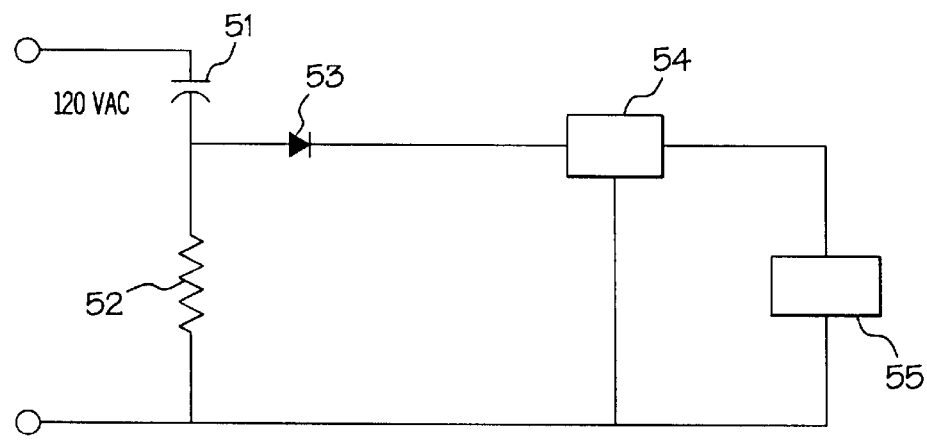
FIG. 10 is a diagrammatic representation of an electrical circuit for an active plate in which a load is integrated.
Figure 12:
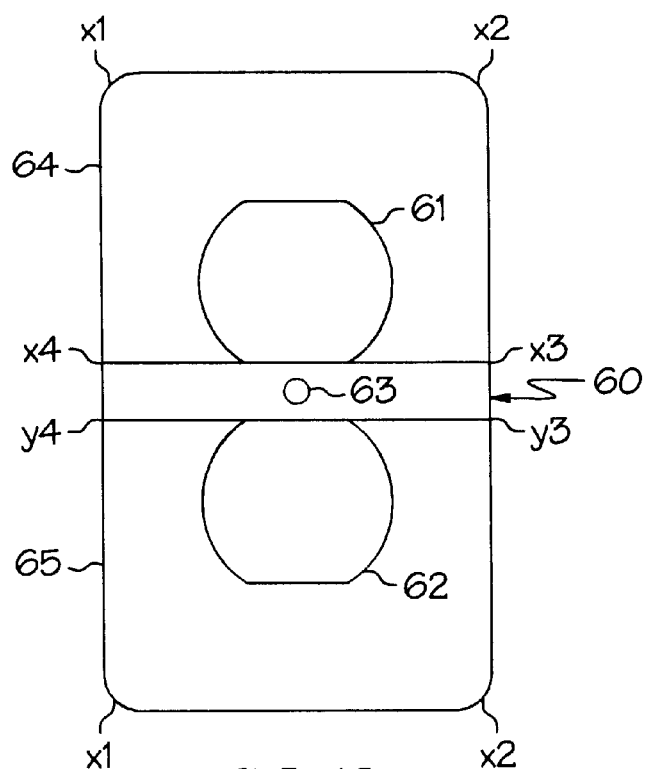
FIG. 12 is a front view of an active cover plate for twin plug-in sockets in a standard duplex receptacle, the cover plate being substantially transparent and integral with upper and lower arrays of organic light-emitting diodes (OLED) powered by a battery which is also integral with the cover plate.

In each of the applications where an electroluminescent panel is used, it may be substituted with one, but typically an array of OLEDs integrally combined with a substantially transparent cover plate so as to allow the OLED(s) to be visible when activated. OLEDs are self-luminous electroluminescent devices based on thin organic films as the light emitter, typically requiring less drive voltage to produce a bright visible light than a conventional LED which has a crystalline origin. The basic OLED structure is well known and consists of a stack of thin organic layers sandwiched between a transparent anode and a metallic cathode. The organic layers comprise a hole-injection layer, an emissive layer and an electron transport layer. When an appropriate voltage (typically less than 12 volts) is applied to the cell, the injected positive and negative charges recombine in the emissive layer to produce light. When the array of OLEDs requires more than about 0.1 watt of power, the cover plate is powered by a battery which is also integrally combined therewith. Referring to FIG. 12, there is shown a front view of a cover plate 60, formed from an essentially non-conductive transparent synthetic resinous material such as polycarbonate, having a pair of vertically spaced apart apertures 61, 62 correspondingly sized and shaped to receive the sockets of a duplex receptacle 20 illustrated in FIG. 3. Integral with the cover plate, and on the rear thereof are upper and lower flat arrays of OLEDs 64 and 65, respectively, hard-wired into the cover plate so that when it is installed, the OLEDs are always activated. Upper OLED 64 is in the area defined by corners x1, x2, x3 and x4; lower OLED 65 is in the area defined by corners y1, y2, y3 and y4. A single OLED array may occupy the entire available area on the cover plate, or as shown, more than one array may be placed on the cover plate at chosen locations. Referring to FIG. 10, the array(s) constitute the load 55, the precise voltage and current required being delivered by the combination of capacitor 51, resistor 52 and rectifier 54.

Multiple arrays of OLEDs may be activated together or sequentially. If sequential operation is desired, this may be done automatically using appropriate microchip technology for using a flip-flop switch, well-known in the art.

Figure 13:
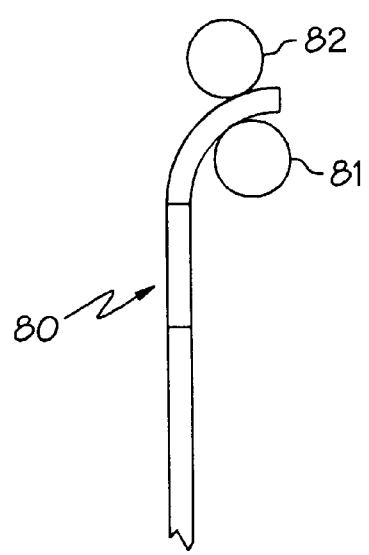
FIG. 13 is a schematic representation of a cover plate for a switch or a receptacle in which the load is selectively activated using a reed switch and associated magnet means in a passage integral with the cover plate.

In the event the arrays are to be activated only upon demand, or if only one of two arrays is to be used while the other is left unactivated, a manual switch may be provided which is part of and incorporated within the cover plate. Referring to FIG. 13 shows a side elevation of only the upper portion of a cover plate 80, and a reed switch 81 positioned adjacent a passage 82 for accepting a magnet. The passage 82 is integrally incorporated in an edge of the cover plate, as is the reed switch 81 which is hard-wired into the circuit in the cover plate, and allows manual control. Conveniently the reed switch 81 is positioned horizontally along either the top or bottom edges of the cover plate (shown secured to the underside of the top edge in FIG. 13), or in a bore in a thick cover plate, to cooperatively function with a magnet introduced into the passage, or an adjacent bore in the thick plate. Thus, when a small magnet (not shown) is introduced into the passage 82, the reed switch 81 is actuated and the OLED array is activated. Such a magnet (Ainico rod) may be left in the passage, or removed if it is desired to leave the OLED array switched off. It will now be evident that the reed switch and its associated passage will be equally effective if positioned along the vertical edges of the cover plate.

With a suitable electronic means well-known in the art a simple moving image can be programmed into the controller for the OLED array(s).

In this novel utilization of a reed switch and its associated adjacent passage means for housing a magnet with sufficient power to actuate the reed switch is incorporate within and forms an integral portion of the cover plate. The reed switch provides a surprisingly effective means for avoiding a switch which might present any undue electrical hazard.

Figure 14:
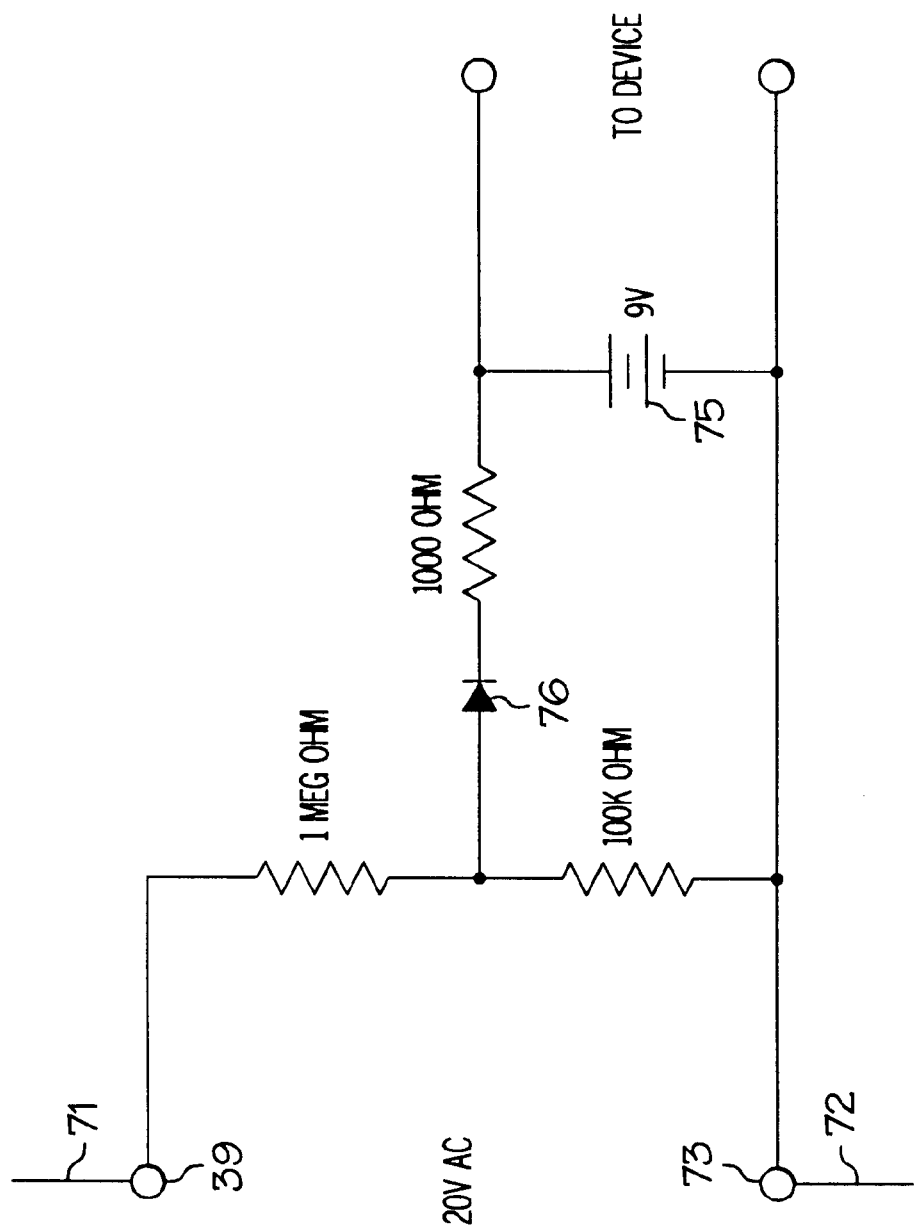
FIG. 14 is a diagrammatic representation of an electrical circuit for an active plate for a switch in which circuit in which power more than 0.1 watt is drawn from a battery connected in the circuit.

Referring to FIG. 14, power is drawn through power wire (black) 71 connected to terminal 39 (see also FIG. 6) and from the ground (green) wire 72 used to ground the switch. Current flows through terminal 39, then through the return lead, to terminal 73 which is grounded to the ground wire 72 through screw-hole 25 in the frame of the switch (see FIG. 6). Because current flows through the green wire, it must be limited to a very low current, insufficient to trip a circuit breaker, typically less than 5 milliamps, or the circuit breaker may be tripped. It is such a current no greater than 5 milliamps which powers the circuit shown in FIG. 14. In this circuit, energy is stored in battery 75. As shown, for example, a 1 MEGohm resistor limits the current in the 110 V line. The 100K resistor sets the voltage to about 11 volts and the rectifier 76 delivers the small direct current to charge battery 75 and the return lead to terminal 73 is grounded. The 1000 ohm resistor limits the charging current to the battery 75. A typical battery, small enough to fit inside the cover plate can store 0.1 Joule or more of energy to deliver current for any active load to be used. A full charge of 1 coulomb on the battery is adequate for most foreseeable applications, and will require about 3 hr to accumulate. Since only a fraction of the stored charge is used to activate the OLEDs, the battery should return to a full charge in a few minutes.

The advantage of the circuit shown in FIG. 14 is that one can use a cover plate for a wall-mounted switch, rather than a cover plate for a receptacle, particularly when the load is desired at about waist level; it is recognized that a duplex receptacle and its cover plate is typically near the floor. Further, though the current charging the battery is small, a much larger current can be drawn for short intervals, the size of the battery being limited only by the ability of the cover plate to integrally incorporate it.

As is now evident the cover plate of this invention in one embodiment comprises an electroluminescent material or array of OLEDs, preferably in the form of a laminar synthetic resinous composite, and a pair of oppositely disposed spring-strips in electrical contact with the composite to provide direct contact with fastening means which connect a source of potential to the body of a switch or wall receptacle without the spring-strips being plugged into the body of either, the spring strips extending in a generally orthogonal direction from the rear of the cover plate and being secured thereto by securing means which ensure electrical connection between the spring-strips and the source of potential, but which securing means are insulated from the front face of the cover plate.

Figure 8:
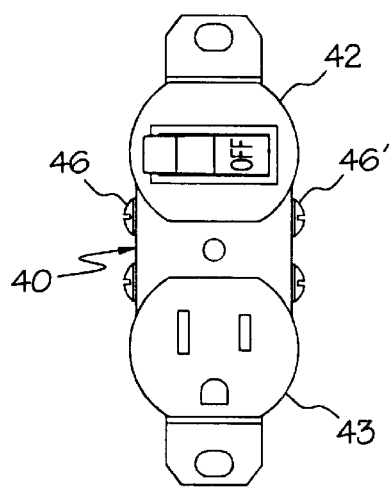
FIG. 8 is a front view of a standard combination switch and receptacle.

Schematically illustrated in FIG. 8 is a standard combination switch and receptacle 40 having a switch 42 and a receptacle 43. A switch 42 is typically used to turn on an incandescent or fluorescent light above a mirror, while the receptacle 43 is used to plug in an appliance such as an electric razor. At present, plugging in the prongs of a Limelite® electroluminescent panel into the receptacle 43 precludes using the socket for plugging in another appliance except through a triple-tap outlet or other adapter-plug. It is not desirable to use a triple-tap outlet plug in the available socket so as to plug an electroluminescent panel into a socket in the triple-tap outlet plug.

Figure 9:
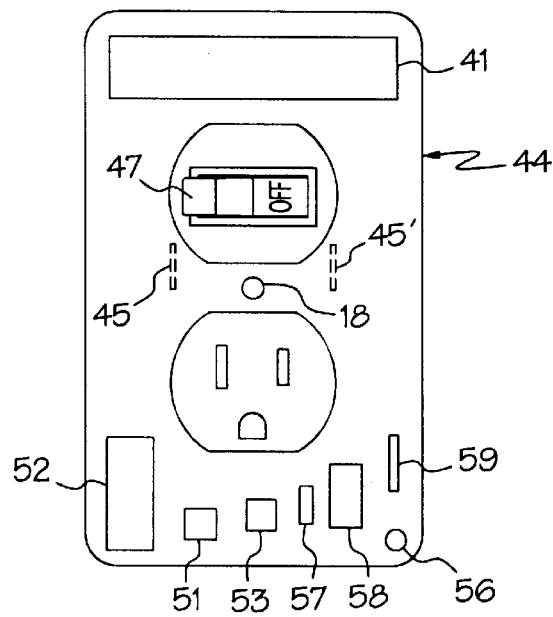
FIG. 9 is a front view of an active cover plate for the standard combination switch and receptacle shown in FIG. 8, the cover plate having not only an electroluminescent panel embedded therein, but also a circuit illustrated in FIG. 10, including a power consuming load such as components, illustrated in FIG. 11, for a transmitter embedded in the cover plate.

FIG. 9 schematically illustrates such a single-aperture cover plate 44, having an active circuit for a transmitter as well as an electroluminescent panel 41 embedded therein, and because the panel is always illuminated when the cover plate is positioned over the combination switch and receptacle 40, allows one to find the handle 47 of the switch 42 in the dark. The active plate 44 provides the power otherwise provided by a battery. In an embodiment analogous to that previously illustrated in FIG. 1, the cover plate 44 has a pair of horizontally opposed spring plates 45, 45' shown in phantom outline, protruding rearward on either side of the vertical axis through the cover plate, positioned to contact opposed terminals 46, 46' of the switch 42.

The embedded active circuit, schematically illustrated in FIG. 10, includes a desirable active device such as a transmitter or receiver. It is preferred to limit the power to the load by use of a capacitive divider, to prevent excessive heat build-up in the plate. The capacitive divider makes it unnecessary to use a bulky transformer to step down the voltage in the main supply line (120 V or 220 V AC). As before, the electrodes of the panel 41 are connected to terminals 45, 45' respectively, as are the terminals for the active circuit for the transmitter. The components of the circuit for the transmitter are sandwiched between plastic panels or otherwise embedded in plastic. These components include a capacitor 51 through which current is supplied, resistor 52 connected between terminals of a 120 V AC source, and a rectifier 53; the current which is filtered through a filter means 54 and flowed to a load 55 as shown in FIG. 10. Load 55 includes a LED 56, a miniature microphone 57, a transmitter 58 and a magnetic switch 59 to turn on the circuit. In a typical embodiment, the voltage used by the active element, whether transmitter or receiver and related components, or any other active element, consumes power in the range of from about 1 to about 10 watts.

The "load" is any device which can be integrated in the cover plate, typically by having the components of the load embedded between superimposed plastic plates. As an illustrative example, 1 μfd (microfarad) capacitor 51 provides about 2650 ohms impedance to limit the current (at 120 V) to 45 milliamps or less. The choice of resistor 52 ranges from about 75 ohms (which provides 3.4 volts) to about 150 ohms (to provide 6.8 volts). The power dissipated in 52 is typically in the range from about 150 to 300 milliwatts. Values of 51 and 52 can be chosen to be compatible with the load to make power dissipation as small as desired.

Typical loads are (a) a small FM transmitter and microphone; (b) a radio receiver and annunciator to respond to a door bell or a radio smoke alarm signal. The radio signal from the doorbell can be broadcast at low power on FM, or can be transmitted at low frequency (150 KHz) over the existing power wiring. The doorbell or smoke detector switch activates a miniature oscillator putting out about 1 watt at 170 KHz. This signal is coupled to the AC wiring by a capacitor and can be detected throughout a building. The load is a miniature radio receiver tuned to 170 KHz. When a signal is detected at this frequency, the signal activates a piezo-electric buzzer in the cover plate. It is possible to have both the doorbell annunciator and the smoke alarm activated in the same circuit by choosing different radio frequencies for each. For example, the doorbell sounder could occur on 170 KHz and the smoke alarm on 150 KHz. The receiver receives a signal generated elsewhere by a transmitter, typically up to 100 ft away, which transmitter is activated by a door bell or smoke alarm. As will be evident, the circuit illustrated in FIG. 10 shows the load which may be either a transmitter or a receiver depending on the circuitry and the antennae, and preferably the frequencies chosen for each will be different.

Instead of a transmitter or receiver the load may be an ultrasonic motion detector. The circuit elements embedded in the cover plate will include an ultrasonic generator, and an ultrasonic receiver. The receiver is adjusted to detect any changes in the sound field and to sound an alarm when such change is detected.

Instead of an ultrasonic detector, the load may comprise a light source and photoelectric sensor which is directed to a mirror opposite the active cover plate, for example, across the room. Interruption of the light beam is detected by the sensor and sounds an alarm.

It will be evident to one skilled in the art that analogous circuits may be embedded in the cover plate to serve different functions, each circuit including a load and a combination of a resistor and capacitor and rectifier to produce an appropriate DC voltage and current preferably filtered to remove 60 and 120 Hz s components. With sufficiently small and compact circuit elements more than one of the foregoing functions may be combined in a single cover plate.

Figure 11:
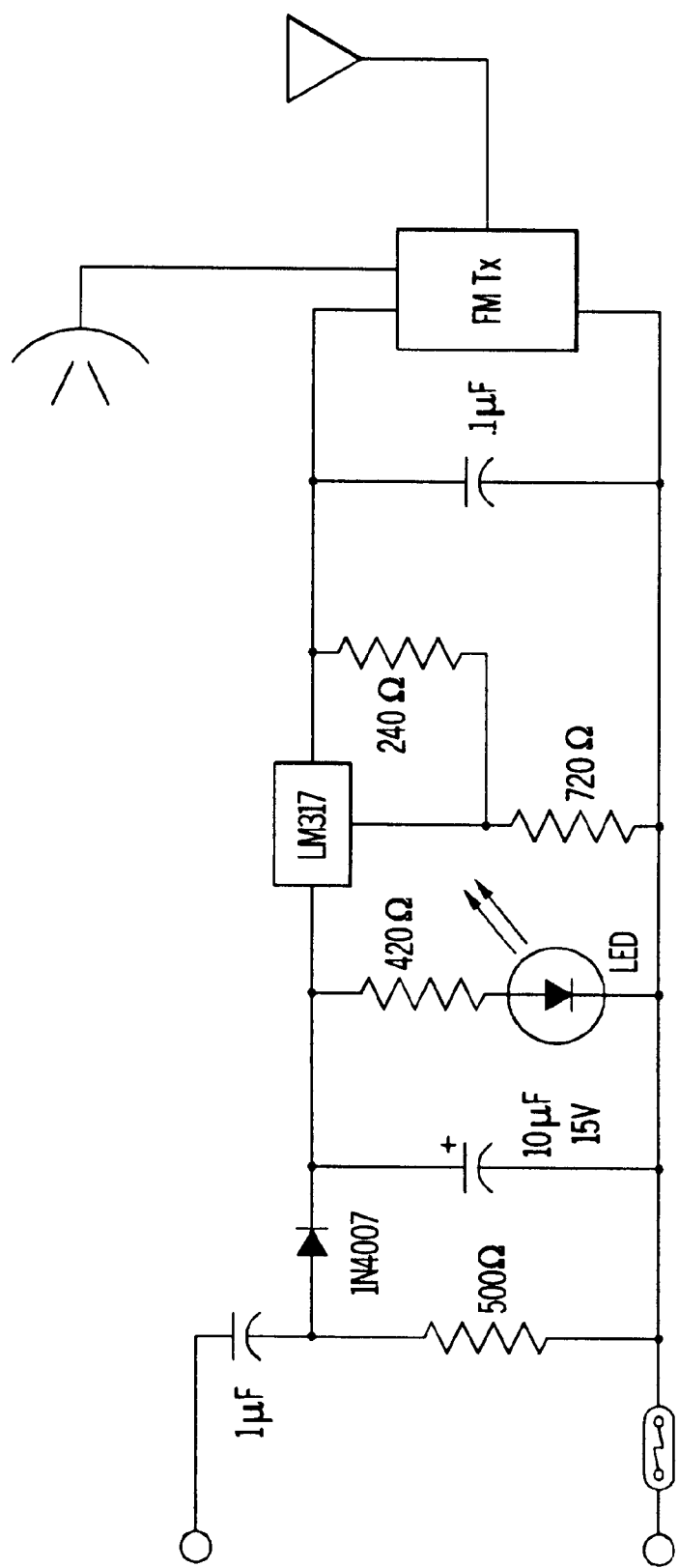
FIG. 11 is a diagrammatic representation of an electrical circuit for an active plate in which a load includes a transmitter.

Referring to FIG. 11 there is indicated a specific circuit in which the "load" is an embedded transmitter 51. The load includes a micro-miniature wireless FM microphone such as is sold by Herbach and Rademan Company, Mount Laurel, N.J. 08054-1012, in which a buffered wireless microphone operates in a desired frequency range, preferably from 88 MHz to 108 MHz FM, the frequency of any broadcast FM. A combination of a 1 μf capacitor and a 500 Ω resistance provides current which is rectified with a 1N 4007 rectifier. An effective filter is provided with a 10 μcapacitor, an LM317 active filter and a 0.1 μ capacitor. Feedback to the LM317 is set by 240 Ω and 720 Ω resistors. The filtered current flows to an FM transmitter provided with the microphone and an antenna tuned to the desired frequency. Preferably, a magnetic switch is provided in the 120V AC line to turn the circuit on, or to switch it off, and a LED is connected through a 470 Ω resistor to light up when the switch turns the transmitter on. An essentially similar active cover plate with a transmitter, when installed on a wall receptacle in each room of a house, allows transmissions from any room to be monitored by an FM receiver operating to receive the transmissions.

The circuit components are laid out within a mold in which a plate is molded around the components appropriately wired together, namely a pair of spring-strips positioned to contact terminals of the device; the microphone and transmitter; LED; magnetic leaf switch; 1 μf capacitor; 0.1 μf capacitor; 500 Ω resistance; 10 μf capacitor; 1N 4007 rectifier; 470 Ω resistance; 240 Ω resistance; and, LM317 active filter. Liquid resin is poured over the components and the resin cured. The transmitter is switched on by placing a magnet against the leaf switch. Upon installing the cover plate on a duplex receptacle, the switch is activated and the microphone responds to noises and voices. The transmitter broadcasts somewhere in its frequency range. A standard FM radio is used to find that broadcast signal. Upon finding the signal the transmitter can be tuned to a preferred frequency. The cover plate installed in a baby's bedroom or in the room of a person in ill health now functions to broadcast the sounds from that room whether they are the baby's cries or noises made by the ill person, to a FM radio receiving the sounds in another room.

In an analogous manner, an active plate may be provided with an analogous circuit in which the load is an integrated receiver, except that the components of the circuit will be chosen to match the power requirements of the receiver. The receiver receives a RF signal which originates in a doorbell smoke alarm, or other device. Reception of the signal activates an alarm of chosen type, such as a flashing light, bell or horn. In either case, the components of the circuit are housed in the cover plate.

Most electronic devices adapted to be integrally incorporated as a load (e.g. in FIG. 10) into a cover plate, whether for a receptacle or for a switch, or for both, require a low voltage DC power supply, typically less than 48 volts and less than 0.1 ampere.

Figure 15:
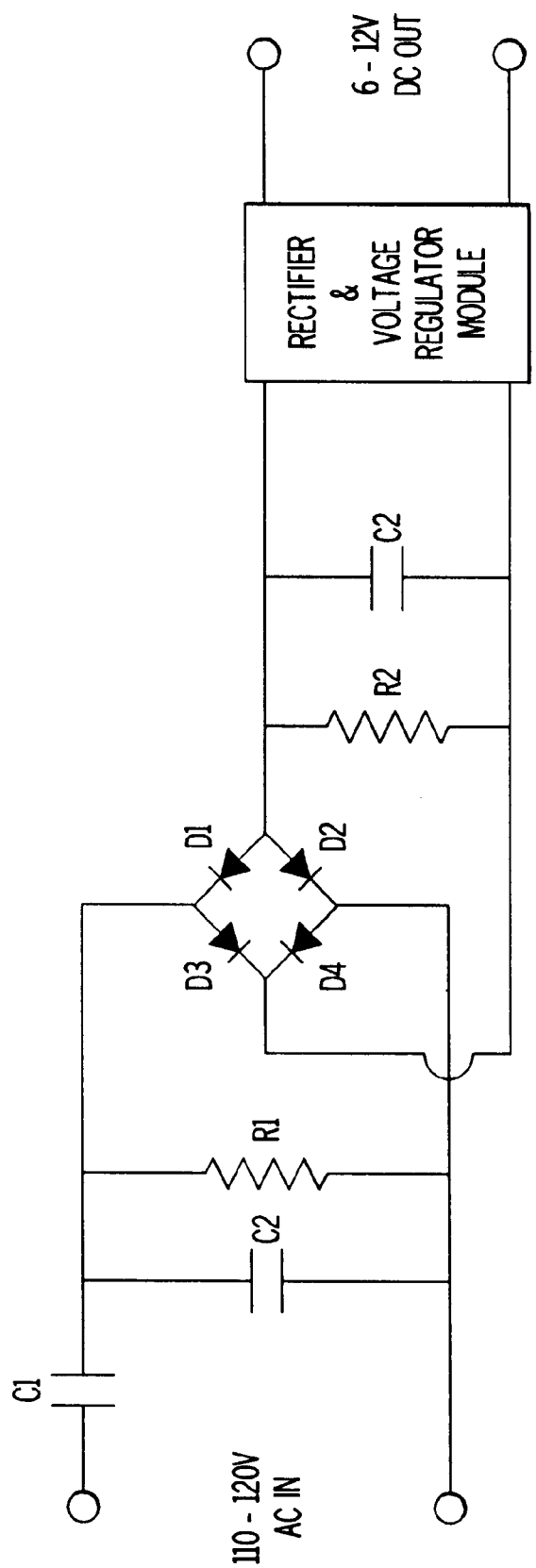
FIG. 15 is a diagrammatic representation of an electrical circuit connected across the terminals of the 110 V lines connected to a receptacle, to deliver a relatively small current at from 6–12 volts DC.

When the required current is small, a simple capacitor divider and rectifier circuit connected across the terminals of the 110 V lines connected to a receptacle, deliver 6–12 volts DC with minimal AC ripple. Such a circuit is illustrated in FIG. 15. As an illustrative example, typical values for the various components are as follows: resistors R1 and R2=150 ohms each; C1=1 µFd (200 V AC); C2, C3=10 µFd; the rectifier and voltage regulator module IC-1=National Semiconductor LM305A or equivalent; and, D1, D2, D3, D4 are solid state diode rectifiers 1N4001.

Figure 16:
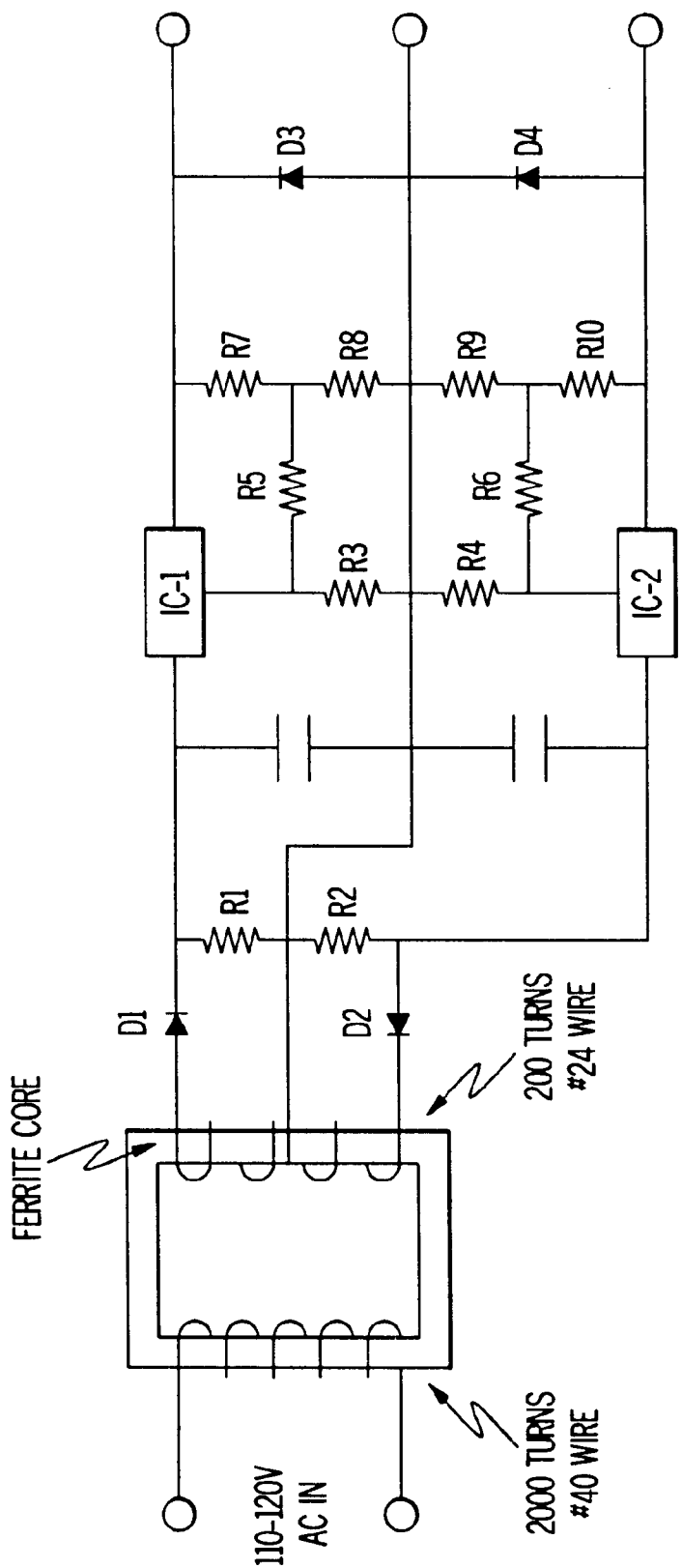
FIG. 16 is a diagrammatic representation of an electrical circuit connected across the terminals of the 110 V lines connected to a receptacle, to deliver a relatively large current using a transformer embedded in the cover plate.

Referring to FIG. 16 there is illustrated a circuit which will deliver a relatively larger current than the circuit shown in FIG. 15. In FIG. 16, the core of a transformer 60 is a flat rectangular frame of ferrite on one side of which is wound approx 2000 turns of fine wire (e.g. # 40) and the inductance of this winding is approximately 2 Henries to keep the transformer from being unduly heated. The secondary winding on the opposite side of the frame is provided by the appropriate number of turns of #24 wire (e. g. 200 turns), the ratio of the turns in the primary and secondary windings being chosen to provide the desired DC voltage for the device in the active cover plate. A center tapped secondary (as shown in FIG. 16) may be used to deliver + or −5 volts for applications which require a balanced power supply.

In an illustrative example, D1, D2, D3, D4 are provided by a solid state diode rectifier 1N4001; R1, R2 are each 100 ohms; R3, R4 are each 33 ohms; R5, R6 are each 240 ohms; R7, R8 are each 500 ohms, chosen to adjust output voltage; R9, R10 are each 500 ohms and IC-1, IC-2 are LM340-5 (National Semiconductor) or equivalent.

A specific application includes a simple high frequency radio receiver and annunciator, for example, to produce a siren or whistling sound, which is integrally incorporated into an active cover plate. The receiver may respond to a particular frequency, or it may respond to a binary coded pulse sequence on that frequency, in a manner analogous to that used in a conventional remote-controlled garage-door opener. A pulse code receiver is particularly useful when the active duplex cover plate is to respond to signals from several different sources.

For example, when a button switch activates a conventional circuit to ring a bell to indicate someone is at the door, the button switch is also connected to a transmitter which simultaneously transmits a pulse code to a receiver which, upon recognizing the pulse code, activates an LED (light emitting diode) or OLED in the cover plate. In a large house in which cover plates in all rooms are provided with a radio receiver and annunciator or LED, in which house the door bell may not easily be heard in the far reaches of the house, every cover plate will either make a sound or light up a LED or both. For a person with badly impaired hearing, the activation of an LED would be a welcome substitute.

Figure 17:
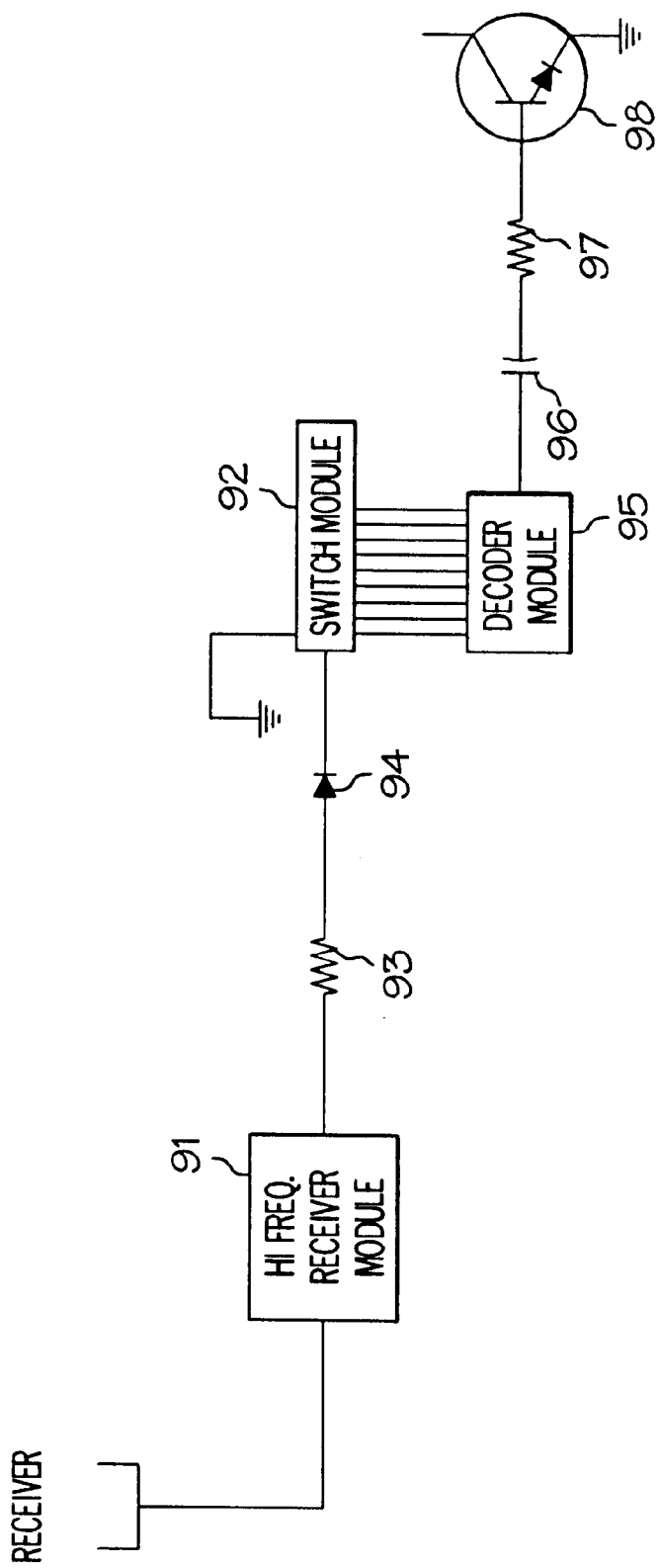
FIG. 17 is a diagrammatic representation of an electrical circuit for a receiver connected to a switch module and decoder module.

A circuit which provides the aforedescribed function is illustrated in FIG. 17, wherein a high frequency receiver module 91 receives a pulse code at a particular frequency and transmits it to a switch module 92 through a resistance 93 and a rectifier 94. The frequency for the pulse code transmitter is preferably in the UHF range (e.g. 900 MHz) and of sufficiently low power to limit reception of the signal to about 30 meters (100 feet) and responds to multiple pulse codes. A useful frequency is in the range used for garage door openers and to control model airplanes. Decoder module 95, operatively connected to switch module 92 decodes the pulse code and transmits current through capacitor 96 and resistance 97 to a load shown as transistor 98 which then actuates an LED or the annunciator. The receivers are each hard-wired to one of the codes and responds to that code when it is received. An analogous circuit is commercially available in a Sears Model 139.663820 garage door opener assembly.

It will now be evident that various events may each be provided with a transmitter which transmits a pulse code assigned to that event, on the frequency which the receiver receives. For example, the door bell may be assigned a first pulse code, the telephone may be assigned a second pulse code, a smoke alarm may be assigned a third pulse code, etc., and each pulse code when decoded actuates an assigned different color of LED; e.g. the door bell corresponds to a green LED, the telephone to a yellow and the smoke alarm to a red LED. Thus, occupants of a hotel room fitted with a cover plate and integral receiver would be alerted to a smoke alarm inaudible to them because the alarm sounded in a distant room, even one on another floor. They would be alerted by a whistle or siren (or other sound), or brightly colored LED, or both, since each of the devices may be used singly, or in combination. The room-annunciator is particularly helpful for those who may have enough loss of hearing to enable them to sleep through a smoke alarm even in an adjacent room.

Figure 18:
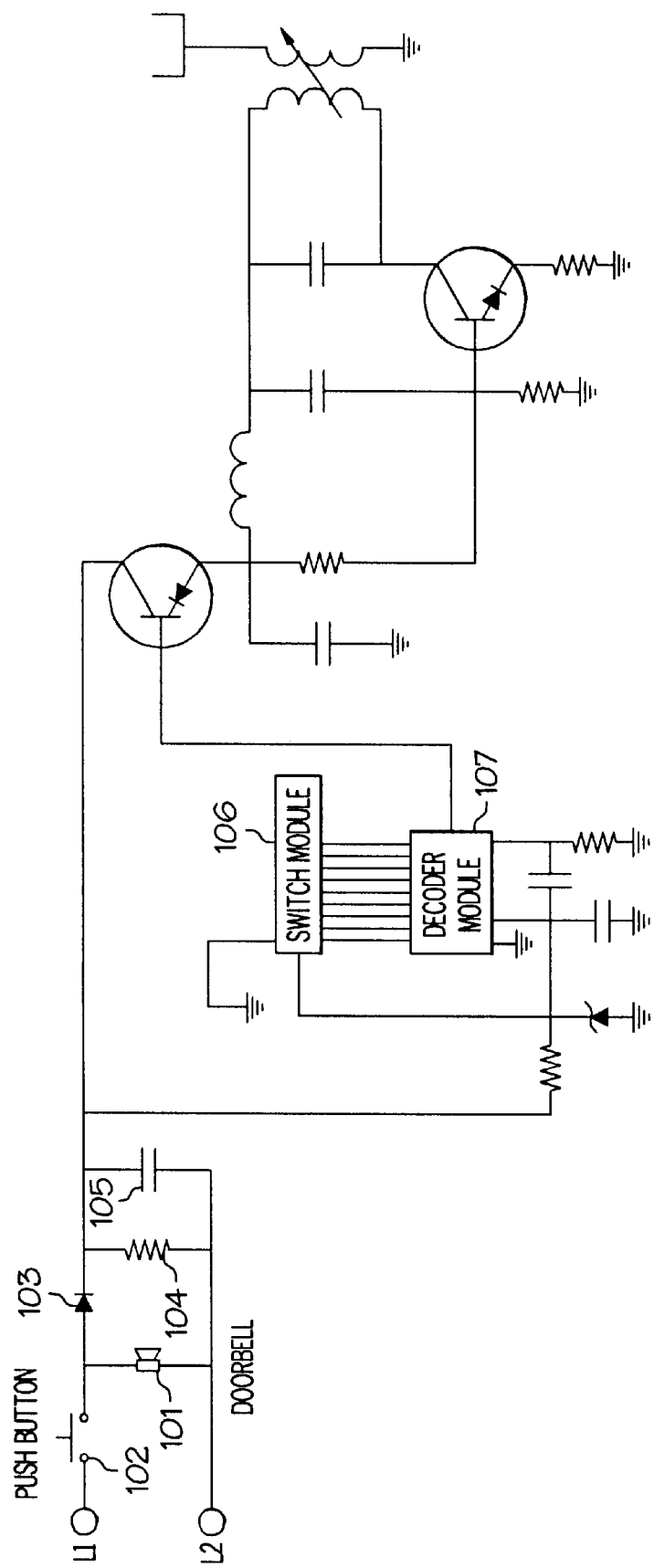
FIG. 18 is a diagrammatic representation of an electrical circuit for a transmitter connected to a door bell and a switch module and decoder module.

Referring to FIG. 18 there is shown a transmitter circuit analogous to one provided with a conventional garage-door opener assembly, in which circuit current from lines L1 and L2 actuates the door bell 81 when the bell button connects the terminals of switch 102. In addition, current is conducted through the components of the circuit, including a rectifier 103, resistance 104 and capacitor 105, to convert AC power to DC for the switch module 106 operatively connected to encoder module 107 which thereafter transmits the chosen pulse code. The transmitter circuit shown is provided on a chip and may be connected to a smoke alarm which is already provided with 9 volts DC, so that when the smoke alarm is activated, it closes the switch to activate the transmitter.

Figure 19:
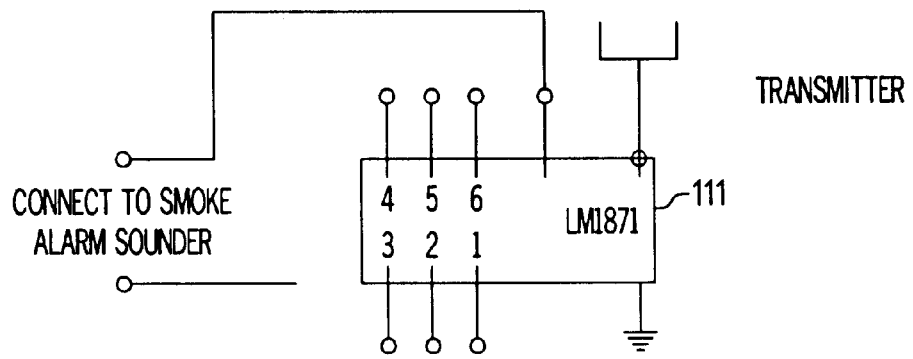
FIG. 19 is a schematic illustration of a conventional transmitter.

Referring to FIG. 19 there is illustrated a transmitter 111 of the type commercially available as a LM1871 which is connected across the terminals of a smoke alarm (not shown) sounding switch, so that when the switch is closed, the transmitter is activated. This integrated circuit provides 6 signal channels, adequate s for typical applications for an active cover plate. The transmitter includes multiple switches (commonly 8) which can be preset to deliver one of 256 different pulse codes. An analogous circuit is provided in a transmitter on a key fob for keyless entry into an automobile. In an active cover plate, as few as 2 switches to deliver 4 pulse codes would suffice. When smoke activates the alarm, current is simultaneously flowed to the transmitter which transmits a pulse code to be received by a receiver in a cover plate.

Figure 20:
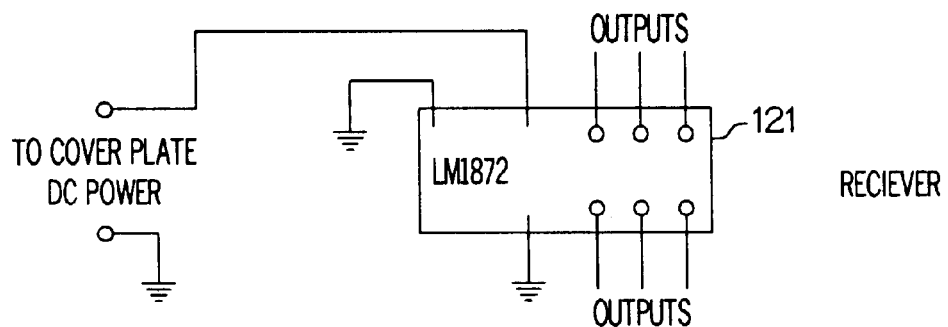
FIG. 20 is a schematic illustration of a conventional receiver.

Referring to FIG. 20 there is illustrated a receiver 121 of the type commercially available as a LM1872 which is connected across the terminals of a DC power supply in a cover plate (not shown); this receiver corresponds to the transmitter LM1871. When the receiver receives the transmitted pulse code the appropriate annunciator or LED is actuated as described in FIG. 17.

Figure 21:
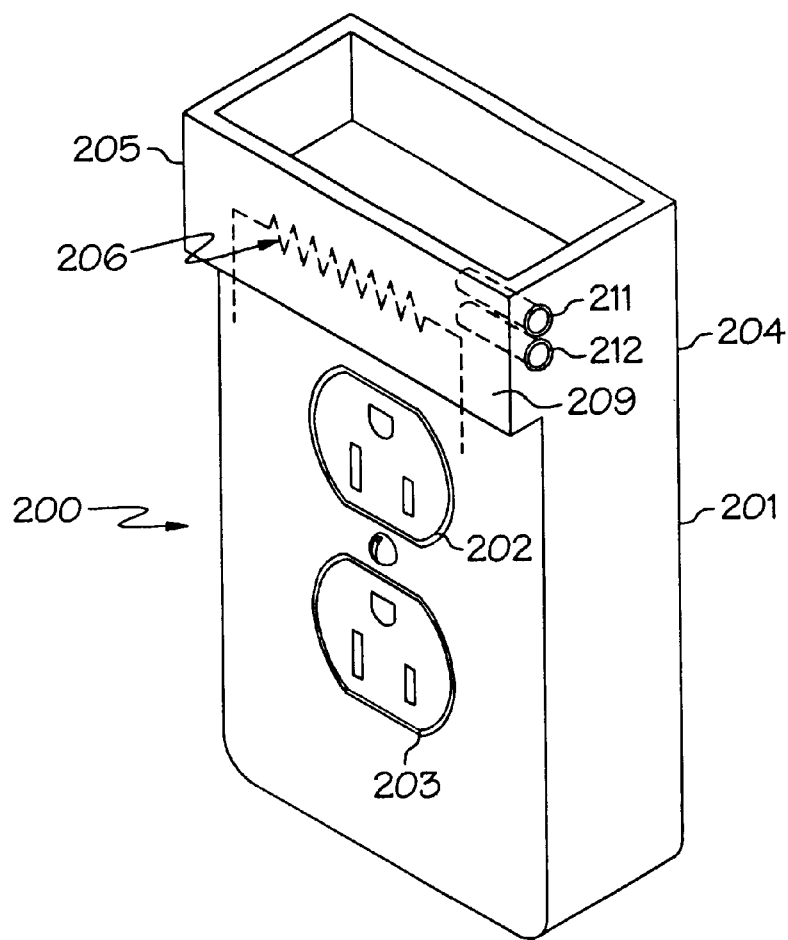
FIG. 21 schematically illustrates a duplex receptacle over which a modified cover plate is installed.
Figure 22:
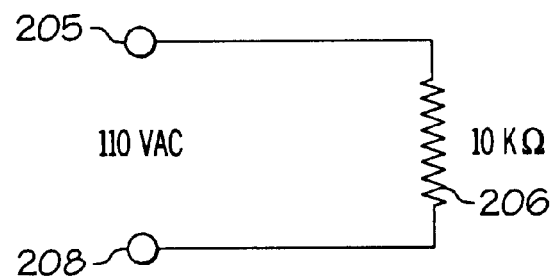
FIG. 22 is a detail of a circuit including a heating element which is embedded in the upper portion of the cover plate.

Referring to FIG. 21 there is schematically illustrated a cover plate indicated generally by 200 including vertically spaced apart apertures 202 and 203 installed over a conventional duplex receptacle. Lower body portion 201, including the apertures 202, 203 are dimensioned in a manner similar to a conventional cover plate, but the upper portion 204, above apertures 202, 203 has integrally formed therewith a first trough 205. Preferably the front or rear walls, or the bottom of the first trough 205 has a heating means 206 embedded in it. The heating means, shown embedded in front wall 209, is preferably resistance wire having a resistance in the range from about 5,000 to about 10,000 ohms, the resistance being sufficient to heat the trough to a predetermined extent. As shown in FIG. 22, the resistant wire is connected across terminals 207, 208 so that it is hard-wired into the incoming 110 VAC line and the first trough is continuously heated. Preferably, a second trough 209 is placed within first trough 205, so as to establish good heat transfer through contact along the coextensive bottoms of the troughs. The second trough is used to contain a vaporizable compound, typically a fragrant liquid or sublimatable solid which is heated to a temperature sufficient to generate a vapor pressure which will allow the compound to be smelled or otherwise sensed.

If desired, the heating means may be manually turned on and off as desired by using a reed switch 211 and associated adjacent passage means 212 shown installed in the front wall 209, and used in a manner described in FIG. 13.

Having thus provided a general discussion, described the invention in detail and illustrated it with specific examples of the best mode of making and using it, it will be evident that the active cover plate has provided an effective solution to an old problem. It is therefore to be understood that no undue restrictions are to be imposed by reason of the specific embodiments illustrated and discussed, and particularly that the invention is not restricted to a slavish adherence to the details set forth herein.

I claim:

1. In an active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said electrical device after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body, the improvement comprising, said load including an array of organic light emitting diodes and said cover plate means is essentially transparent to visible light.

2. The active cover plate means of claim 1 including a reed switch and a passage in said cover plate means, said passage being adapted to removably sheath a magnet means effective to actuate said reed switch, said passage being proximately disposed relative to said reed switch.

3. In an active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said electrical device after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body, the improvement comprising, said load including a transmitter.

4. In an active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said electrical device after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body, the improvement comprising, said load including a low voltage DC power supply less than 48 volts and less than 0.1 ampere.

5. In an active cover plate means for an electrical device having predetermined specifications including a receptacle and a cover plate therefor, said receptacle having a body with at least a pair of terminals for connection to a source of electrical current, said active cover plate means having an upper portion, comprising, biasing contact means protruding rearward from said cover plate means and adapted to contact said terminals exteriorly of said body without interfering with the wiring of said electrical device after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body, the improvement comprising, said cover plate including a trough integrally formed with said cover plate's upper portion, said trough being adapted to contain a vaporizable compound, said trough having embedded therewithin said load including a heating element adapted to be heated to a temperature sufficient to generate a vapor pressure enabling said compound to be sensed.

6. The active cover plate means of claim 5 including a reed switch and a passage in said trough, said passage being adapted to removably sheath a magnet means effective to actuate said reed switch, said passage being proximately disposed relative to said reed switch.

7. In an active cover plate means for an electrical device having predetermined specifications including a receptacle and a cover plate therefor, said receptacle having a body with at least a pair of terminals for connection to a source of electrical current, said active cover plate means comprising, biasing contact means protruding rearward from said cover plate means and adapted to contact said terminals exteriorly of said body without interfering with the wiring of said electrical device after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body, the improvement comprising, said load including a receiver and signalling means able to be sensed by a human.

8. The cover plate means of claim 7 wherein said signalling means includes an annunciator.

9. The cover plate means of claim 7 wherein said signalling means includes a light emitting diode.

10. An active cover plate means for a switch having a body with at least a pair of terminals for connection to a power lead of a source of electrical current, said active cover plate means comprising, biasing contact means protruding rearward from said cover plate means and adapted to contact said terminals exteriorly of said body without interfering with is the wiring of said switch after it is installed;

each said biasing contact means being in electrical contact with said pair of terminals and in physical and electrical contact with an active load embedded within said cover plate and including wiring, wherein said load is directly supplied with electrical power through said plate which consumes power, in a manner so as to preclude human contact with a component of a circuit capable of inflicting a shock, said contact means connecting said load to a source of potential without said biasing means being plugged into said body.

11. The cover plate means of claim 10 wherein a return lead from said load is connected to a power consuming appliance.

12. The cover plate means of claim 10 is essentially transparent to visible light and wherein said load is an array of organic light emitting diodes.

13. The active cover plate means of claim 10 including a reed switch and a passage in said cover plate means, said passage being adapted to removable sheath a magnet means effective to actuate said reed switch, said passage being proximately disposed relative to said reed switch.

14. The cover plate means of claim 10 wherein said load draws less than about 0.1 watt.

15. The cover plate means of claim 10 wherein said load draws more than about 0.1 watt, including a battery means and a circuit limiting power consumption to about 5 milliamps at the ground wire, said circuit comprising ratioed resistances and a rectifier, and a load-limiting resistor and wherein said battery means is adapted to deliver from 1 to 20 milliamps at a voltage in the range from about 5 to 15 volts.

16. A method of producing an active cover plate means for an electrical device having a unit-molded body on the exterior of which at least a pair of terminals is adapted for connection to a source of electrical current, comprising, embedding connecting wires and components of a circuit including an active load within said cover plate so that the load is directly supplied with electrical power through said plate which consumes power; and, securing a pair of oppositely disposed biasing means in electrical contact with said cover plate, said biasing means protruding rearward from said cover plate, said biasing means being adapted to contact said terminals exteriorly of said body without removal of said electrical device after it is installed.

* * * * *